Figure 1:
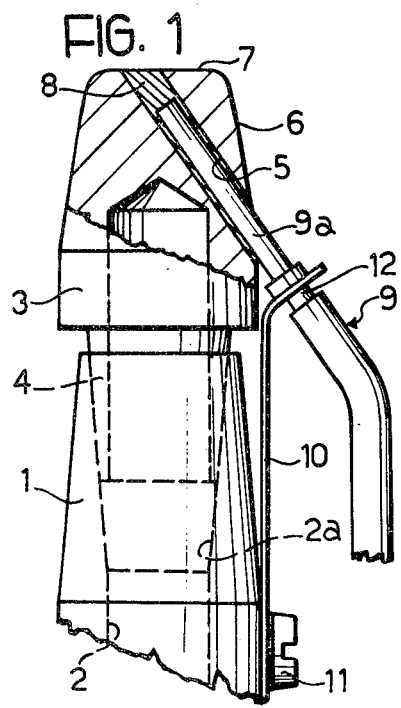

United States Patent [19]

Ferrero et al.

[11] 4,388,516
[45] Jun. 14, 1983

[54] ELECTRODE TIP FOR ELECTRIC SPOT WELDING

[75] Inventors: Mario Ferrero, Turin; Giovanni Balestrino, Orbassano, both of Italy

[73] Assignee: Centro Ricerche Fiat S.p.A., Orbassano, Italy

[21] Appl. No.: 248,632

[22] Filed: Mar. 27, 1981

[30] Foreign Application Priority Data

May 14, 1980 [IT] Italy .............................. 67758 A/80

[51] Int. Cl.³ .............................................. B23K 9/24
[52] U.S. Cl. ..................................... 219/119; 219/109
[58] Field of Search ......................... 219/109, 110, 119

[56] References Cited

U.S. PATENT DOCUMENTS

| 2,440,463 | 4/1948 | Cornwall | 219/119 |
| 3,529,121 | 9/1970 | Bobo | 219/109 |
| 4,214,164 | 7/1980 | Traub | 219/110 X |

FOREIGN PATENT DOCUMENTS

| 797462 | 7/1958 | United Kingdom | 219/98 |
| 369993 | 4/1973 | U.S.S.R. | 219/119 |

Primary Examiner—Elliot A. Goldberg
Attorney, Agent, or Firm—Sughrue, Mion, Zinn, Macpeak and Seas

[57] ABSTRACT

An electrode tip for electric spot welding is formed with a hole which extends from one side of the tip to the end surface of the tip and is arranged to receive one end of a radiant energy conveyor which is intended to transmit a signal indicative of the temperature reached at the end surface of the tip. An insert is fitted within the hole with interference and arranged adjacent to the end surface of the tip in order to ensure the continuity of the said end surface.

1 Claim, 4 Drawing Figures

ELECTRODE TIP FOR ELECTRIC SPOT WELDING

The present invention relates to electrodes for electric spot welding. In particular the invention relates to an electrode tip for electric spot welding.

It has already been proposed (see for example U.S. Pat. Nos. 2,363,719 and 2,464,402) to use a probe sensitive to infra-red rays to measure the temperature reached on the end surface of an electrode tip whilst welding is in progress. In particular, U.S. Pat. No. 4,214,164 relates to a spot welding control system which uses a radiant energy conveyor as a probe, constituted for example by a flexible bundle of optical fibres or by a rigid light pipe. In the present patent application it is proposed to use an electrode tip formed with a hole extending from one side of the tip towards the end surface of the tip. One end of the conveyor may thus be inserted in the hole in such a manner as to lie adjacent the end surface of the tip. If sufficient sensitivity is to be obtained in the probe, the distance between the bottom of this hole and the end surface of the electrode tip should be as small as possible. This limits the life of the electrode in that the successive dressing operations to which it is subjected cause material to be removed from the tip.

The object of the present invention is to provide an electrode tip for electric spot welding which enables the use of a radiant energy conveyor for taking the temperature reached whilst welding is in progress, and which has a life comparable to that of electrodes of the type which have normally been used to date.

In order to achieve this object the present invention provides an electrode tip for electric spot welding which is formed with a hole extending from one side of the tip towards the end surface of the tip, said hole being arranged to receive one end of a radiant energy conveyor which is intended to transmit a signal indicative of the temperature reached at the end surface of the tip, characterised in that the hole extends up to the said end surface and in that the electrode tip further comprises an insert which is interference fitted inside the hole and arranged adjacent to the end surface of the tip in order to ensure the continuity of the said end surface.

The tight fit of the insert within the hole enables the insert to resist the pressure exerted on the end surface of the tip during welding.

When it is necessary to dress the electrode tip, the insert is displaced within the hole to move it away from the end surface of the electrode tip. The tip may then be dressed with material being taken from its end surface until its level reaches the level of that end surface of the insert which faces towards the end surface of the electrode tip.

The distance separating the end of the bundle of optical fibres inserted in the electrode tip, from the end surface of the tip thus remains unchanged during subsequent dressing operations. This enables the life of the electrode tip to be prolonged, rendering it equal to that of a normal electrode which has not been prepared for infra-red recording. Moreover, the range of the signal transmitted from the optical fibres remains nearly constant during the life of the electrode, since the end of the bundle of optical fibres which is inserted in the tip remains at all times at the same distance from the end surface of the point. Due to this characteristic, the aforesaid distance may be very small enabling a greater sensitivity of measurement of the infra-red emissions to be obtained.

Further characteristics and advantages of the present invention will become apparent from the following description with reference to the appended drawings, supplied purely by way of non-limiting example and in which:

FIGS. 1 to 4 show an electrode tip for electric spot welding according to the present invention, in four different operating conditions.

In the appended drawings, there is shown the end of an electric spot welding electrode 1 provided with a coaxial hole 2 having a frusto-conical end part 2a. An electrode tip 3 provided with a shank 4 is interference fitted within the frusto-conical part 2a of the hole 2. The electrode tip 3 has a hole 5 which extends from one side 6 of the electrode tip 3 up to the end surface 7 of the tip.

An insert 8 is interference fitted within the hole 5 and is arranged adjacent the end surface 7 of the tip 3 in such a way as to ensure the continuity of this end surface.

The insert 8 is formed of the same material as that of the electrode tip (copper alloy) or of a material which is of greater hardness (for example a sintered copper-tungsten product).

Reference 9 indicates one end of a flexible bundle of optical fibres (hereinafter for the sake of brevity referred to as "optical fibre"). An end part 9a of the optical fibre 9 is inserted into the hole 5 from the side 6 of the tip 3 and is arranged adjacent the insert 8. The electrode 1 is provided with a support 10 for the optical fibre 9. The support 10 is formed by a flat spring which is screwed at one end 11 to the electrode 1 and is provided at its other end with a hole 12 for the insertion of the end portion 9a of the optical fibre 9.

Figure 2:
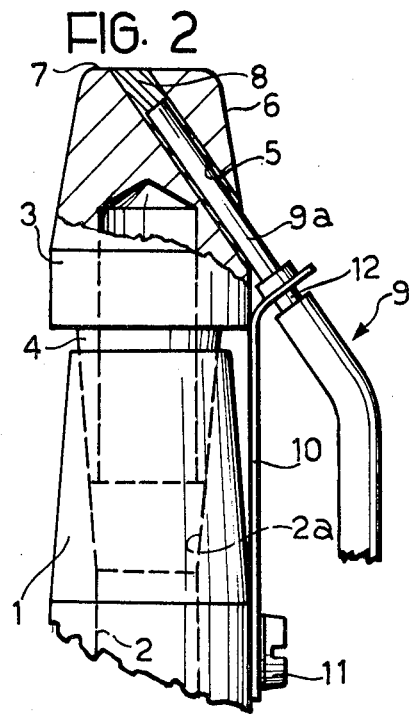

FIGS. 1 and 2 respectively show a new electrode tip and a worn electrode tip.

Figure 3:
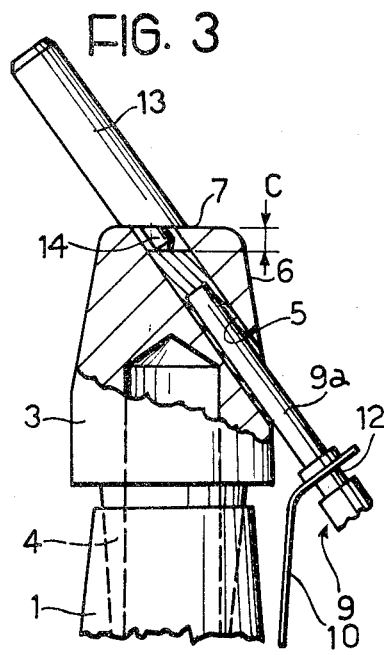
Figure 4:
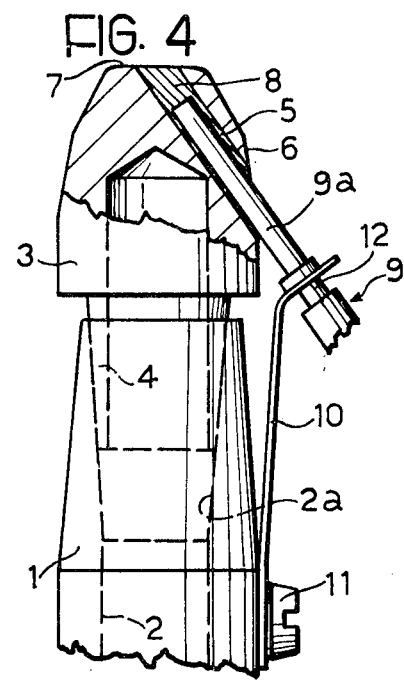

When the electrode tip is in the condition illustrated in FIG. 2 it is necessary to dress it. In this event, the insert 8 must first be moved within hole 5 in the direction of the side 6 of the electrode tip, as illustrated in FIG. 3. In carrying out this operation, use can be made of a punch 13 provided with a point 14 capable of acting on the insert 8 from the end surface 7 of the tip 3, driving it into hole 5. During this operation the flat spring 10 deforms to enable the optical fibre 9 to move back. When the insert 8 is at a predetermined distance, indicated by C in FIG. 3, from the end surface 7 of the tip 3, the tip can then be dressed with material being removed therefrom until the end surface 7 is brought back to the level of the insert 8, as shown in FIG. 4. The distance which exists between the end of the optical fibre 9 inserted within hole 5, and the end surface 7 of the electrode tip 3 thus remains unchanged during the life of the electrode despite successive dressings of the tip.

In order to extract the optical fibre 9 from the electrode 1, the flat spring 10 has to be deformed until the end portion 9a of the optical fibre 9 has been completely withdrawn from the hole 5; the flat spring 10 may then be rotated around the axis of screw 11 thus enabling the optical fibre to be released from the support 10.

The present invention is also applicable where other known types of infra-red radiant energy conveyors are used in the place of optical fibres, for example a light pipe formed by an internally polished copper tube or a number of sapphire bars articulated together.

We claim:

1. An electrode tip for electric spot welding comprising a tip having a hole which extends from one side of said tip up to the end surface of said tip for receiving one end of a flexible bundle of optical fibers which is intended to transmit a signal indicative of the temperature reached at said end surface of said tip, an insert interference fitted within the hole and arranged adjacent to said end surface of said tip in order to insure the continuity of said end surface and resilient means comprised of a flat spring fixed at one end to said electrode and provided at the other end with a support seating for said bundle of optical fibers for biasing the end of said bundle of said optical fibers located in said hole against said insert.

* * * * *